US011617154B2

(12) United States Patent
Busser et al.

(10) Patent No.: US 11,617,154 B2
(45) Date of Patent: Mar. 28, 2023

(54) MITIGATING OF ROGUE RESPONDERS WHEN GEO-LOCATING WIRELESS DEVICES

(71) Applicant: SR Technologies, Inc., Sunrise, FL (US)

(72) Inventors: Ryan Busser, Fort Lauderdale, FL (US); Mark Passler, Boca Raton, FL (US); Olivia Fernandez, Boca Raton, FL (US); Graham K. Smith, Boca Raton, FL (US); Steven Romanow, Sunrise, FL (US)

(73) Assignee: SR Technologies, Inc., Sunrise, FL (US)

( * ) Notice: Subject to any disclaimer, the term of this patent is extended or adjusted under 35 U.S.C. 154(b) by 69 days.

(21) Appl. No.: 17/494,969

(22) Filed: Oct. 6, 2021

(65) Prior Publication Data

US 2022/0141796 A1 May 5, 2022

Related U.S. Application Data

(60) Provisional application No. 63/110,322, filed on Nov. 5, 2020.

(51) Int. Cl.
*H04W 64/00* (2009.01)
*H04W 12/122* (2021.01)
*H04W 12/63* (2021.01)
*H04L 43/0864* (2022.01)

(52) U.S. Cl.
CPC ....... *H04W 64/006* (2013.01); *H04L 43/0864* (2013.01); *H04W 12/122* (2021.01); *H04W 12/63* (2021.01)

(58) Field of Classification Search
CPC ... H04W 64/00; H04W 24/10; H04W 64/003; H04W 64/006; H04W 4/029; H04W 4/02; H04W 72/23; H04W 72/0453; H04W 72/51; H04W 8/24; H04W 16/28; H04W 72/21; H04W 56/001; H04W 4/025; H04W 56/0065; H04W 92/18; H04W 88/02; H04W 56/006; H04W 4/33; H04W 28/0226; H04W 12/106
See application file for complete search history.

(56) References Cited

U.S. PATENT DOCUMENTS

2017/0257758 A1* 9/2017 Aldana ................. G01S 5/0244

* cited by examiner

*Primary Examiner* — Kwasi Karikari
(74) *Attorney, Agent, or Firm* — Christopher & Weisberg, P.A.

(57) ABSTRACT

A method and measuring station to determine the geo-location of a wanted target station in the presence of rogue responder stations are disclosed. One method includes: transmitting a packet with a fictitious address not corresponding to the wanted target station address; transmitting a packet with the wanted target station address; determining at least one of: a first difference between a round trip time (RTT) associated with a response packet from a responder station and an RTT associated with a response packet from the wanted target station; and a second difference between a time of arrival (TOA) associated with the responder station's response packet and a TOA associated with the wanted target station's response packet; and distinguishing between the response from the responder station and the response from the wanted target station based on at least at least one of the first difference and the second difference.

20 Claims, 10 Drawing Sheets

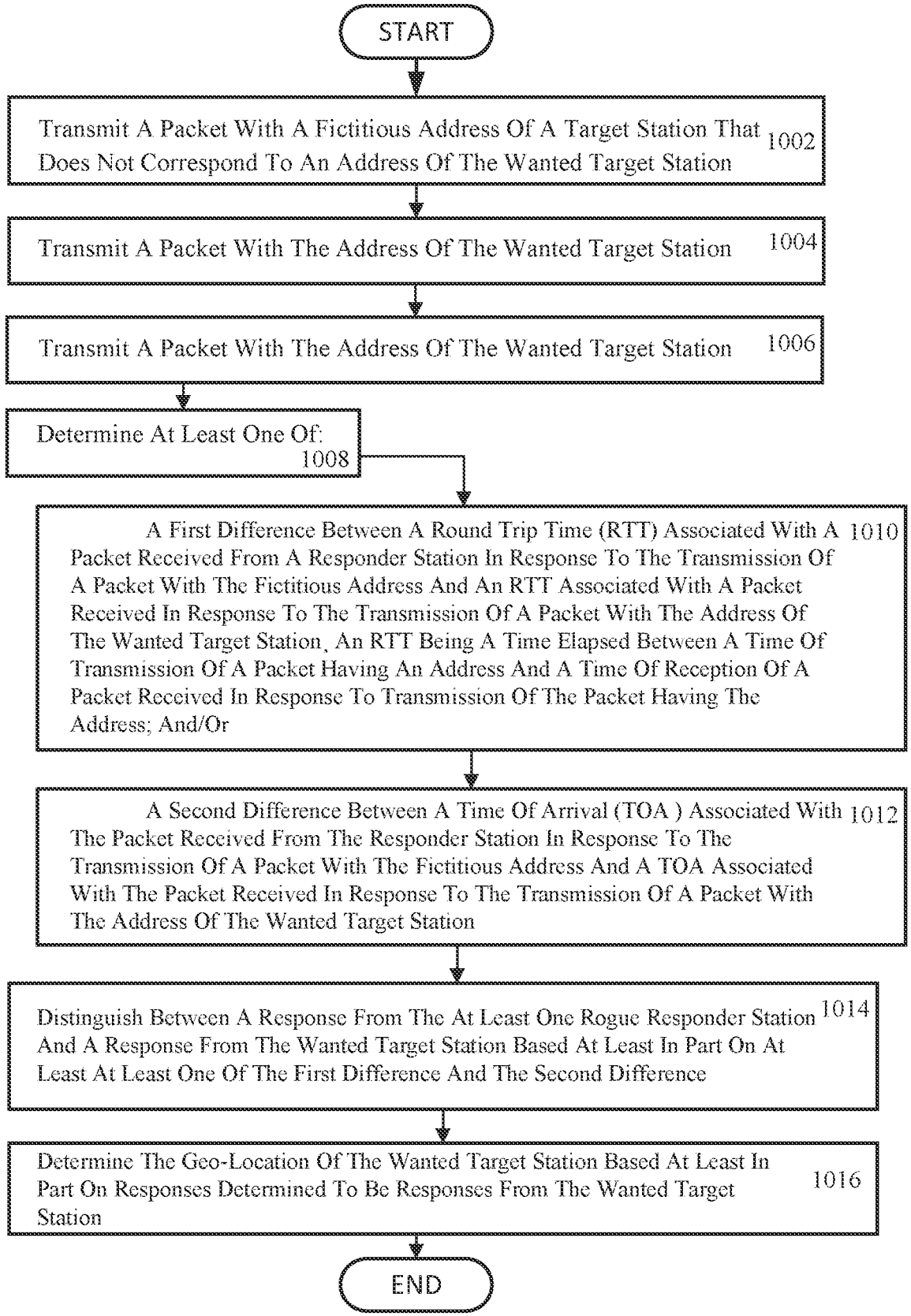

MITIGATING OF ROGUE RESPONDERS WHEN GEO-LOCATING WIRELESS DEVICES

CROSS-REFERENCE TO RELATED APPLICATION

This application is related to and claims priority to U.S. Provisional Patent Application Ser. No. 63/110,322, filed Nov. 5, 2020, entitled MITIGATING OF ROGUE RESPONDERS WHEN GEO-LOCATING WIRELESS DEVICES, the entirety of which is incorporated herein by reference.

TECHNICAL FIELD

The present disclosure relates to geo-location of wireless devices, and in particular to a method and system for the geo-location of wireless local area network (WLAN) devices.

BACKGROUND

Initially, it is noted that IEEE Standard 802.11-2016 is used as the base reference for disclosures used herein, the entire contents of which are incorporated herein by reference. The IEEE 802.11-2016 Standard is commonly referred to as "Wi-Fi" and is referred to as such herein.

The location of wireless devices can be determined by various methods. These methods may be classified as active, passive and combined active and passive. In an active location scheme, a device that is determining the location or range, the measuring device, transmits certain packets, referred to as "ranging packets", to the device being located, i.e., the target device, and a common method is to measure the time of arrival (TOA) of the response packet from the target device and compare that to the time of departure (TOD) of the ranging packet that was transmitted by the measuring device so as to determine the round trip time (RTT).

In an active location scheme, the TOD may be measured for a ranging packet that is transmitted from the measuring station addressed to the target station. The TOA of the response from the target station at the measuring station is then also measured. If the turnaround time for the target station to receive the packet from the measuring station and to start to transmit the response is known, or is known to be a constant, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the ranging packet transmitted from the measuring station to the target station is a data packet, the response from the target station will normally be an acknowledgement (ACK) packet. If the ranging packet transmitted from the measuring station to the target station is a control packet, for example a request-to-send (RTS) packet, then the response from the target station will normally be a clear-to-send (CTS) packet. In these two examples, the turnaround time at the target station is defined in the IEEE 802.11 standard as the short interframe spacing (SIFS), which is a preset value. Hence, the time delay, td, or time of flight (TOF) between the measuring station and the target station, may be determined from the calculation td=(TOA−TOD−SIFS)/2 and the distance between the measuring station and the target station is then td*c, where c is the speed of light. This method of estimating the distance to a target station by measuring the TOD and TOA and accounting for the turnaround time is known.

FIG. 1 is a diagram of a typical location system 100 which includes three measuring stations 110a, 110b, and 110c (referred to collectively herein as "measuring stations" or "measuring receivers" 110). The target station 120 may be a wireless device, such as, for example, an Access Point (AP) that is to be located by the three airborne measuring stations 110. The distance of the target station 120 from measuring station 110a is D1, 130. The distance of the target station 120 from measuring station 110b is D2, 140. The distance of the target station 120 from measuring station 110c is D3, 150. The round trip time, RTT1, determined from the calculation RTT=(TOA−TOD−SIFS), is measured for transmissions from measuring station 110a and this can be used to calculate the distance D1 130 using the formula D1=RTT1*c/2 where c is the speed of light. Similarly, RTT2 and RTT3 measurements result in the determination of distances D2 140 and D3 150. The methods for calculating the location of target station 120 using the distances D1 130, D2 140, and D3 150 are well known.

FIG. 2 is a diagram of a location system where a single airborne measuring station 110 is used. The airborne measuring station 110 is depicted being flown in a circular orbit 200, centered at location E 220. A target station 120 is positioned at location F 230. The distance of the target station 120 from the airborne measuring station 110, when the airborne measuring station 110 is at position A 201, is D4 210. The distance of the target station 120 from the airborne measuring station 110, when the airborne measuring station 110 is at position B 202, is D5 211. The distance of the target station 120 from the airborne measuring station 110, when the airborne measuring station 110 is at position C 203, is D6 212. The three RTT measurements taken when the airborne measuring station 110 is at positions A 201, B 202, and C 203 will yield the distances D4 210, D5 211, and D6 212, thus enabling the location F 230 to be calculated.

SUMMARY

Some embodiments include methods and measuring stations for the geo-location of wireless local area network (WLAN) devices.

According to one aspect, a method in a measuring station is provided to determine a geo-location of a wanted target station in an environment that includes at least one rogue responder station. The method includes: transmitting a packet with a fictitious address of a station that does not correspond to an address of the wanted target station. The method also includes transmitting a packet with the address of the wanted target station. The method also includes determining at least one of: a first difference between a round trip time (RTT) associated with a packet received from a responder station in response to the transmission of a packet with the fictitious address and an RTT associated with a packet received in response to the transmission of a packet with the address of the wanted target station, an RTT being a time elapsed between a time of transmission of a packet having an address and a time of reception of a packet received in response to transmission of the packet having the address; and a second difference between a time of arrival (TOA) associated with the packet received from the responder station in response to the transmission of a packet with the fictitious address and a TOA associated with the packet received in response to the transmission of a packet with the address of the wanted target station. The method also includes distinguishing between a response from the at least one rogue responder station and a response from the wanted target station based at least in part on at least at least one of the first difference and the second difference, and determining the geo-location of the wanted target station based at least in part on responses determined to be responses from the wanted target station.

According to this aspect, in some embodiments, distinguishing between a response from the at least one rogue responder station and a response from the wanted target station includes comparing the determined first difference to a first threshold. When the determined first difference is greater than the first threshold, the method includes using the packet received in response to transmission of a packet with the wanted target station address to determine the geo-location of the wanted target station. In some embodiments, when the determined first difference is less than the first threshold, then: the method further includes comparing the determined second difference to a second threshold; and when the determined second difference is greater than the second threshold, then using the packet received in response to transmission of a packet with the wanted target station address to determine the geo-location of the wanted target station. In some embodiments, the second threshold is obtained by multiplying the first threshold by a ratio of a velocity of the measuring station to a speed of light. In some embodiments, an RTT associated with a packet received in response to transmission of a packet with the wanted target station address is compared to a plurality of RTTs associated with packets received in response to transmission of packets with multiple fictitious addresses. In some embodiments, the fictitious address includes a random number to achieve a likelihood that the fictitious address does not match an address of a rogue responder station. In some embodiments, the fictitious address is included in a medium access control (MAC) address that includes three octets of the MAC containing the random number. In some embodiments, the transmissions of packets with the fictitious address and the wanted target station address alternate. In some embodiments, the method includes retaining an RTT of a response to a transmission of packets with fictitious addresses in memory only when the RTT is less than the first threshold. In some embodiments, at least one of the first threshold and the second threshold is based at least in part on at least one of a speed and altitude of the measuring station.

According to another aspect, a measuring station is configured to determine a geo-location of a wanted target station in an environment that includes at least one rogue responder station. The measuring station includes a transceiver configured to: transmit a packet with a fictitious address of a target station that does not correspond to an address of the wanted target station, and transmit a packet with the address of the wanted target station. The measuring station also includes processing circuitry in communication with the transceiver, the processing circuitry configured to determine at least one of: a first difference between a round trip time (RTT) associated with a packet received in response to the transmission of a packet with the fictitious address and an RTT associated with a packet received in response to the transmission of a packet with the address of the wanted target station, an RTT being a time elapsed between a time of transmission of a packet having an address and a time of reception of a packet received in response to transmission of the packet having the address; and a second difference between a time of arrival (TOA) associated with the packet received in response to the transmission of a packet with the fictitious address and a TOA associated with the packet received in response to the transmission of a packet with the address of the wanted target station. The processing circuitry is further configured to distinguish between a response from the at least one rogue responder station and a response from the wanted target station based at least in part on at least at least one of the first difference and the second difference. The processing circuitry is further configured to determine the geo-location of the wanted target station based at least in part on responses determined to be responses from the wanted target station.

According to this aspect, in some embodiments, distinguishing between a response from the at least one rogue responder station and a response from the wanted target station includes: comparing the determined first difference to a first threshold; and when the determined first difference is greater than the first threshold, then using the packet received in response to transmission of a packet with the wanted target station address to determine the geo-location of the wanted target station. In some embodiments, the processing circuitry is further configured to: when the determined first difference is less than the first threshold, compare the determined second difference to a second threshold; and when the determined second difference is greater than the second threshold, then use the packet received in response to transmission of a packet with the wanted target station address to determine the geo-location of the wanted target station. In some embodiments, the second threshold is obtained by multiplying the first threshold by a ratio of a velocity of the measuring station to a speed of light. In some embodiments, an RTT associated with a packet received in response to transmission of a packet with the wanted target station address is compared to a plurality of RTTs associated with packets received in response to transmission of packets with multiple fictitious addresses. In some embodiments, the fictitious address includes a random number to achieve a likelihood that the fictitious address does not match an address of a rogue responder station. In some embodiments, the fictitious address is included in a medium access control (MAC) address that includes three octets of the MAC containing the random number. In some embodiments, the transmissions of the fictitious address and the wanted target station address alternate. In some embodiments, the processing circuitry is further configured to retain an RTT of a response to a transmission of a packet with fictitious addresses in memory only when the RTT is less than the first threshold. In some embodiments, at least one of the first threshold and the second threshold is based at least in part on at least one of a speed and altitude of the measuring station.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 10 is a flowchart of a process of an example of an embodiment of the disclosure for determining a geo-location of a wanted target station in an environment that includes at least one rogue responder station.

DETAILED DESCRIPTION

A method and devices are disclosed that determine the geo-location of a target station in the presence of one or more rogue responder stations.

Figure 1:
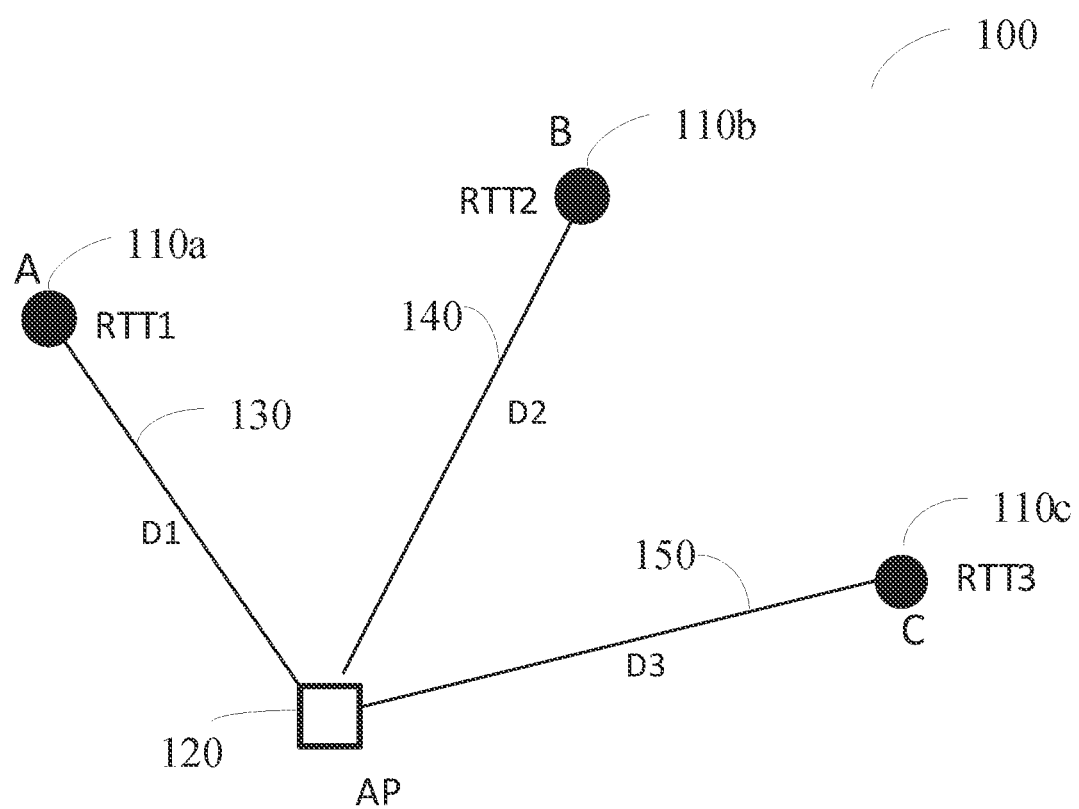
FIG. 1 is a diagram of a typical location system which includes three measuring stations.
Figure 2:
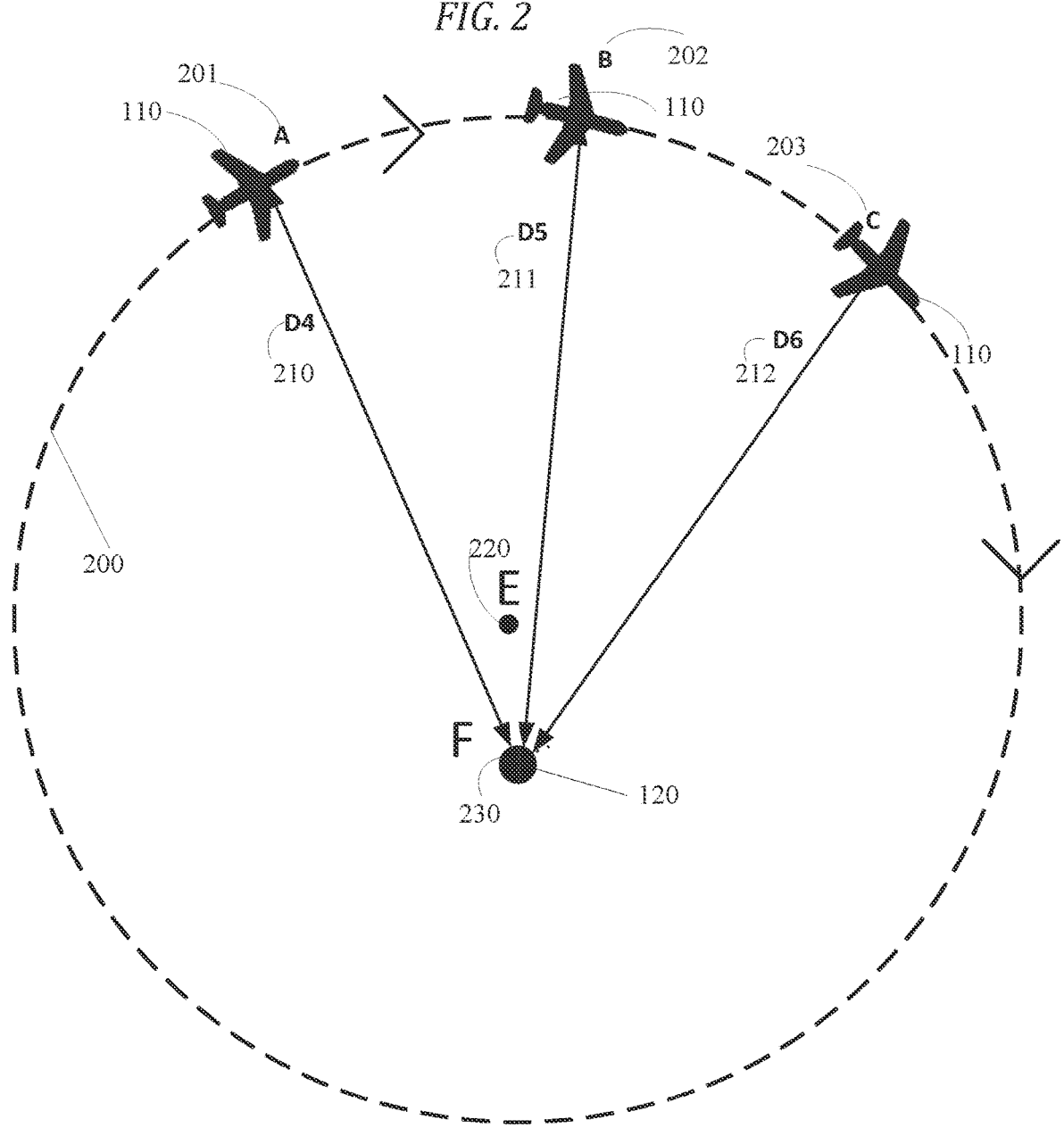
FIG. 2 is a diagram of a location system where a single airborne measuring station 110 is used.
Figure 3:
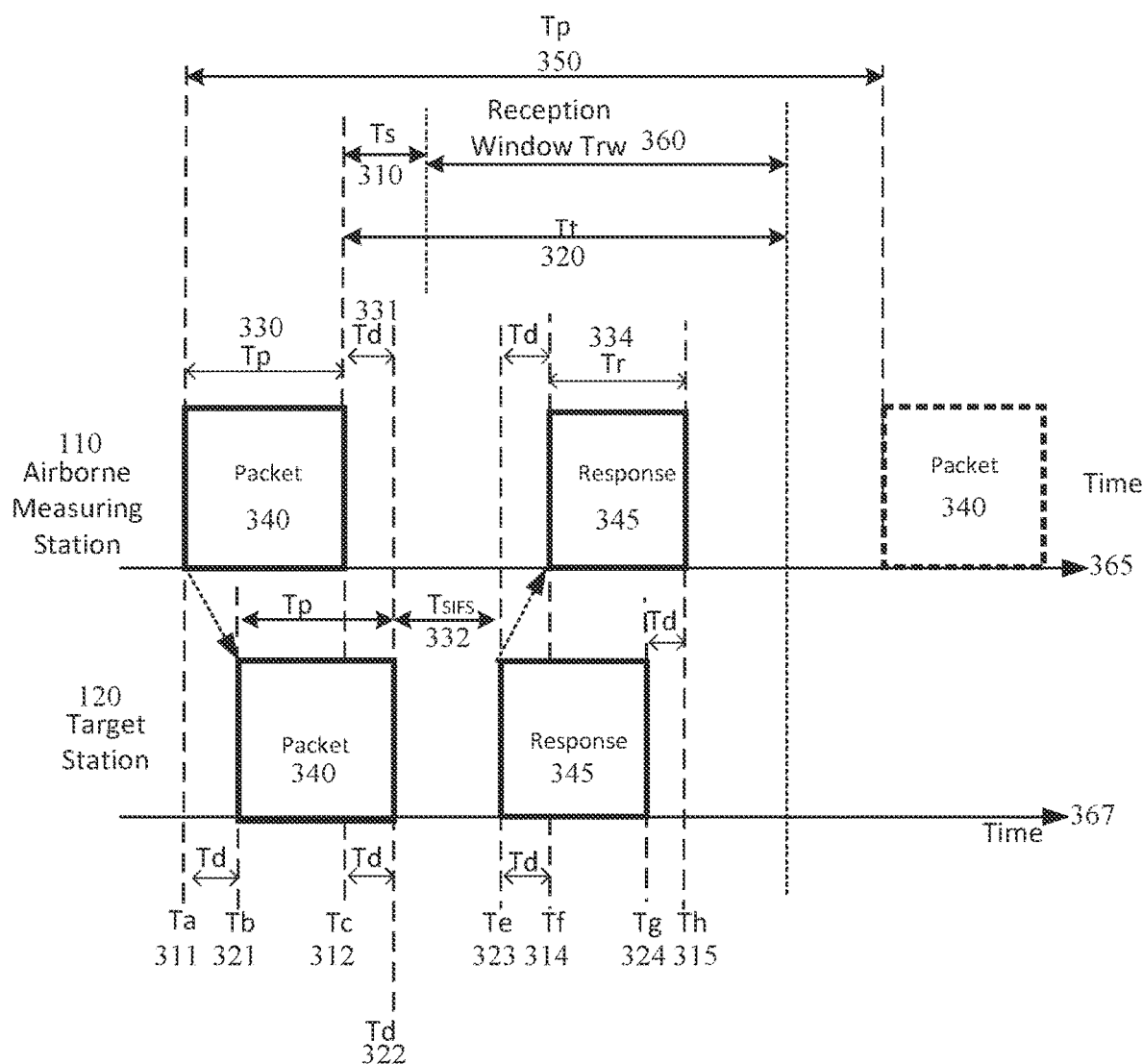
FIG. 3 is a timing diagram that describes a ranging method of the present disclosure that may be used to determine the distance between two wireless devices.

As described above with reference to FIG. 2, based upon a set of measured RTTs and corresponding airborne measuring station 110 locations, and with knowledge of the ground elevation of the target station 120, the airborne measuring station 110 may estimate the position of the target station 120. FIG. 3 is a timing diagram that describes a ranging transmission method that may be used to determine the distance between two wireless devices: an airborne measuring station 110 and a target station 120. Time axis 365 is the time axis for the airborne measuring station 110 and time axis 367 is the time axis for the target station 120. At beginning transmission time Ta 311, airborne measuring station 110 starts the transmission of ranging packet 340 which is addressed to target station 120. After a time-delay of td, at time Tb 321, target station 120 starts to receive ranging packet 340. At transmission time Tc 312, airborne measuring station 110 completes the transmission of ranging packet 340 and at time Td 322, target station 120 completes the reception of ranging packet 340. The time difference between transmission time Tc 312 and time Td 322 is td 331, the propagation time for the packet to travel from airborne measuring station 110 to target station 120. Note that the time differences (Tc−Ta) and (Td−Tb) are both the duration tp 330 of the transmitted ranging packet 340.

Target station 120 transmits the response packet 345 at time Te 323. Assuming that the response packet 345 is an ACK or an RTS packet in reply to the received ranging packet 340, time Te 323 ideally will be at a time $t_{SIFS}$ 332 after time Td 322, where time $t_{SIFS}$ 332 is the SIFS time as defined in the IEEE 802.11 standard. At time Tf 314, airborne measuring station 110 starts to receive the response packet 345. At time Tg 324, target station 120 completes the transmission of the response packet 345 and at reception time Th 315, airborne measuring station 110 completes receiving the response packet 345. Note that the time differences (Tb−Ta), (Td−Tc), (Tf−Te), and (Th−Tg) are all equal and have the value td 331 which is the propagation time for the packet and response to travel between the two stations.

At airborne measuring station 110, the time of a packet at the point when the frame check has completed, may be recorded. Hence, the time for the transmission of ranging packet 340 that is recorded, is transmission time Tc 312, and the time that is recorded for the reception of the response packet 345 is reception time Th 315. In order to calculate the value of td, it is desirable to know the duration tr 334 of the response packet 345. Calculating the duration tr 334 is straightforward as the duration of the response packet 345 is defined in the Standard. In practice therefore, airborne measuring station 110 can calculate the value of td from expression (3):

$$td=(Th-Tc-tr-t_{SIFS})/2 \quad (2)$$

and hence the corresponding distance, $D=td*C$ (3)

where C is the speed of light

Stated another way, airborne measuring station 110 begins transmission of ranging packet 340 at a beginning transmission time Ta 311 and ends transmission of the ranging packet 340 at an ending transmission time Tc 312. Target station 120 receives the first ranging packet 340 at time Td 322 and starts to transmit the response packet at time Te 323. The airborne measuring station 110 receives the complete response packet 345 at an ending reception time Th 315, wherein td 331 is measured as the reception time (Th 315−Tc 312−tr 334−$t_{SIFS}$ 332)/2.

A reception window Trw 360 may be defined which may be related to the range of the target station 120. The reception window starts at time Ts 310 after the end of the transmission time, Tc 312 of ranging packet 340 and ends at time Tt 320 after the end of the transmission time, Tc 312 of ranging packet 340. As an example, the reception window Trw 360 may be set to start at time Ts 310, 10 μs after time Tc 312, and end at time Tt 320, 60 μs after time Tc 312. In this example the duration of the reception window Trw 360 is 50 μs. Airborne measuring station 110 may transmit ranging packets 340 at time intervals of Tp 350.

Hence, with reference again to FIG. 2, in the general sense, as the airborne measuring station 110 flies around the target station 120 transmitting ranging packets either continuously spaced at Tp 350 or in bursts of N transmissions, each transmission within the burst being spaced at Tp 350, airborne measuring station 110 will be measuring the RTT corresponding to its own location (latitude, longitude, altitude). Based upon a set of measured RTTs and corresponding airborne measuring station 110 locations, and with knowledge of the ground elevation of the target station 120, the airborne measuring station 110 can estimate the distance to the target station 120 using equations (2) and (3).

It should be known that there are stations that do not correctly obey the IEEE 802.11 standard, and that such stations spuriously respond to ranging packets 340 that were not addressed to that station. If such a "rogue responder station" is in the vicinity of the wanted target station 120, then spurious response packets may be received by the airborne measuring station 110 in addition to, or in place of, the wanted response packets 345. The ACK or CTS response packet 345 does not include the address of the transmitter of that packet and hence, it cannot be easily determined if the received response packet is from the intended target station 120 or from a rogue responder station. When there are rogue responder stations in the presence of wanted target stations 120, spurious RTT measurements can result in significant errors in the calculated position of the target station 120.

Methods for fitting the RTT measurements to a target position, for example by use of minimization of the summation of the squared residuals (SSR), are known to one skilled in the art.

Figure 4:
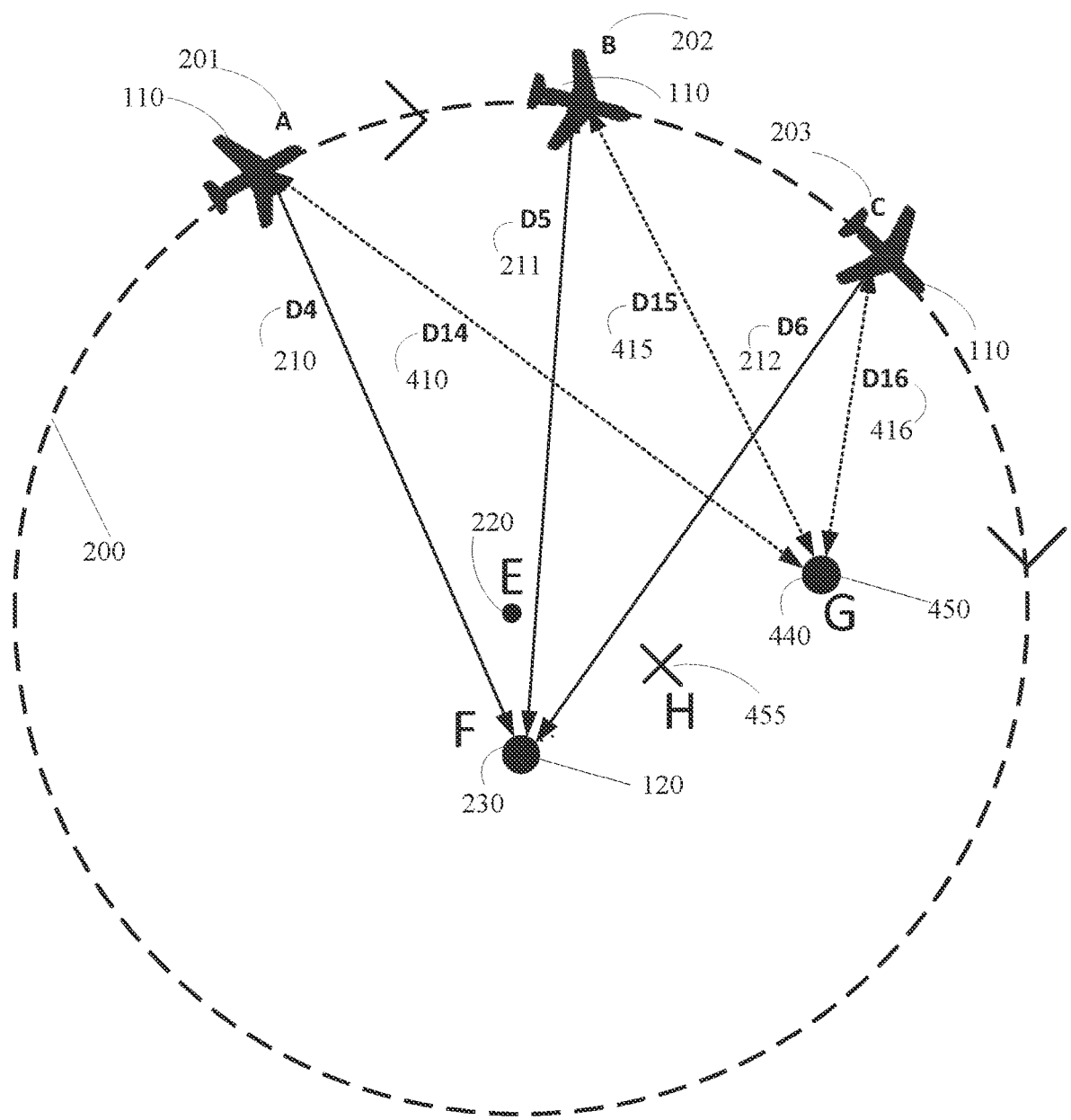
FIG. 4 is a diagram of a location system where a single airborne measuring station is used, a target station is at a location F, and a rogue responder station is at a location G.

FIG. 4 is a diagram of a location system where a single airborne measuring station 110 is used, a target station 120 is at location F 230, and a rogue responder station 450 is at location G 440. When the airborne measuring station 110 is at location A 201, the distance to the target station 120 is D4 210 and the distance to the rogue responder station 450 is D14 410. When the airborne measuring station 110 is at location B 202, the distance to the target station 120 is D5 211 and the distance to the rogue responder station 450 is D15 415. When the airborne measuring station 110 is at location C 203, the distance to the target station 120 is D6 212 and the distance to the rogue responder station 450 is D16 416. Consider the example when airborne measuring station 110 is at position C 203. The RTT for the wanted response packet 345 from target station 120 at location F230 is proportional to D6 212. Similarly, the RTT for a spurious response packet from the rogue responder station 450 at location G 440 is proportional to D16 416. In this example, D6 212 is more than 2 times the distance D16 416 and therefore the airborne measuring station 110, for that position in the orbit 200, may measure RTTs that vary by a magnitude of two times. As discussed previously, because the ACK and CTS response packets do not contain the address of the transmitting station, the airborne measuring device, in this case, cannot distinguish between different RTT values.

Figure 5:
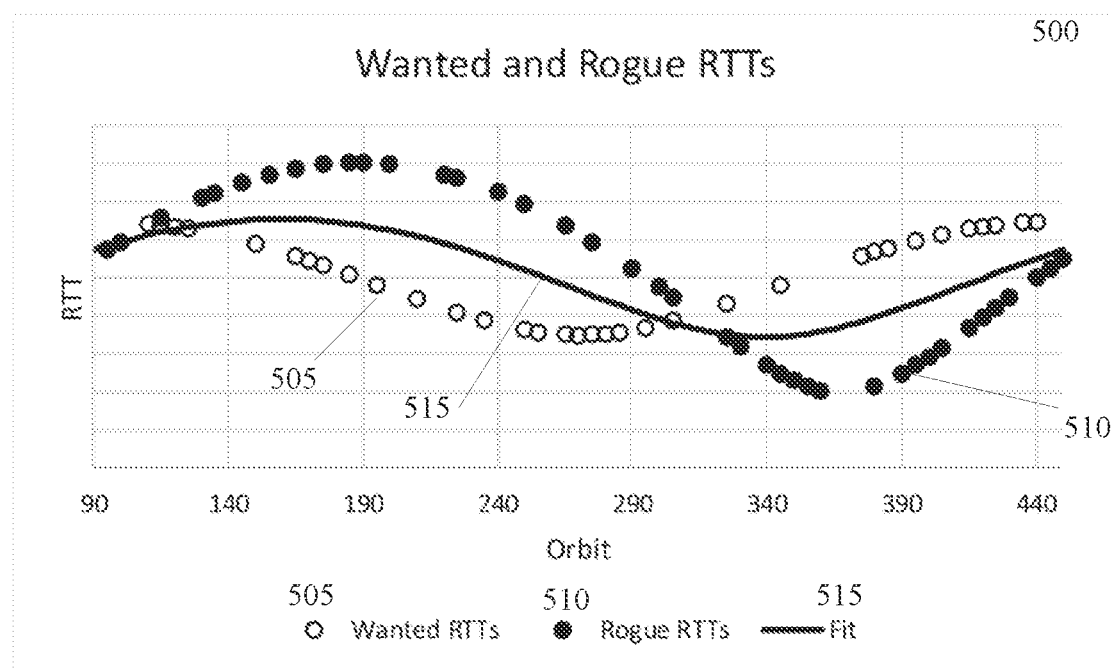
FIG. 5 is a graphical representation of the RTT measurements at the airborne measuring station as it flies around the orbit measuring RTTs that arrive from the wanted target station and the rogue responder station, as depicted in FIG. 4.

FIG. 5 is a graphical representation of example RTT measurements 500 at the airborne measuring station 110 as the airborne measuring station 110 flies around the orbit 200, measuring RTTs that arrive from the wanted target station 120 and the rogue responder station 450, as depicted in FIG. 4. Plot 505 are RTTs from the wanted target station 120, and plot 510 are RTTs from the rogue responder station 450. At the airborne measuring station 110, a best fit curve may be determined, e.g., the result of minimization of the summation of the squared residuals, that uses all the received RTT data. The result of that best fit is plot 515. With reference again to FIG. 4, the result of this best fit curve (plot 515) would calculate the position of the target station 120 incorrectly at location H 455. Hence, the presence of the rogue responder station 450 has caused the location of the target station 120 to be falsely calculated to be at location H 455 and not at location F 230. Referring again to FIG. 5, if the RTTs in plot 510 from the rogue responder station 450 could be removed, then the best fit curve would pass through the wanted RTTs 505.

A method and devices are disclosed that determine the geo-location of a target station 120 in the presence of one or more rogue responder stations.

As discussed above with reference to FIGS. 3 and 4, the airborne measuring station 110 flies around the target station 120 transmitting ranging packets 340 either continuously spaced at Tp 350 or in bursts of N transmissions, each transmission within the burst being spaced at Tp 350. The airborne measuring station 110 receives the response packet 345 and measures the RTT corresponding to its own location (latitude, longitude, altitude). As specified in the IEEE 802.11 Standard, each ranging packet 340 contains the addresses of the airborne measuring station 110 and the target station 120. The response packet 345, however, does not include the address of the station that is responding. As discussed above with reference to FIGS. 4 and 5, there exist rogue responder stations 450 that respond to ranging packets that are not addressed to that station. When such "rogue" response packets 345 are received at the airborne measuring station 110, in response to a ranging packet 340 addressed to the target station 120, the airborne measuring station 110 cannot readily distinguish if the response packet 345 is from the wanted target station 120 or from a rogue responder station 450.

In order to distinguish between the RTTs of the wanted target station 120 and those of a rogue responder station 450, the airborne measuring station may periodically transmit ranging packets 340 using a "fictitious" address for the target station. A "fictitious" address is one that is highly unlikely to be an actual address of a station. For example, the organizational unique identifier OUI, the first three octets of the medium access control address, MAC, may be selected to be a rare or unassigned value, followed by three octets of random value. The first ranging packet 340 or set of N ranging packets, may be transmitted to the address of the target station 120, and the next ranging packet 340 or set of N ranging packets, may be transmitted to a fictitious address. In 802.11 Control packets, such as RTS, CTS, Data Null packets, the "Receiver Address", RA, is the address of the station that is the intended immediate recipient.

In the case that the RA is the fictitious address, then any response packet received is known to be one from a rogue responder station 450. In the case that the RA is that of the target station 120, then any response packet received could be either from the target station 120 or a rogue responder station 450.

Figure 6:
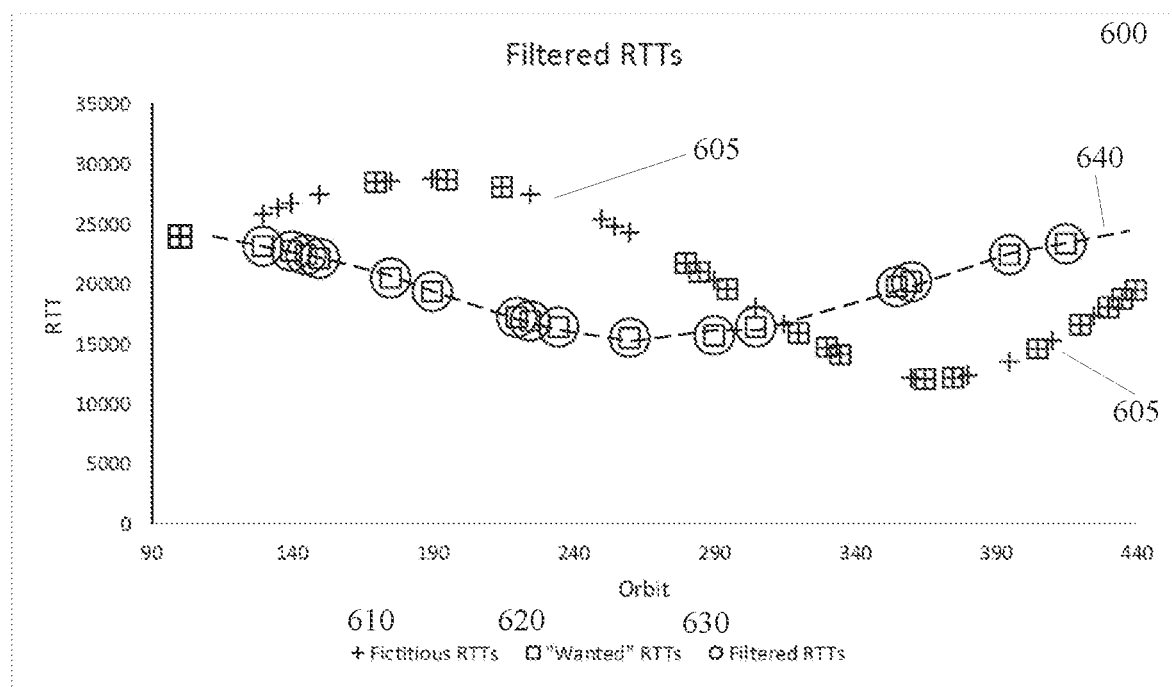
FIG. 6 is a graphical example of RTTs received from both a target station and a rogue responder station when the ranging packets are sent with alternating RAes, a fictitious address and the address of the target station.

FIG. 6 is a graphical example 600 of RTTs received from both a target station 120 and a rogue responder station 450 when the ranging packets are sent with alternating RAs, a fictitious address and the address of the target station 120. Graphical example 600 is representative of the locations depicted in FIG. 4 where the orbit 200 has a radius of about 1.6 miles and the altitude of the airborne measuring station 110 is 5000 feet. The "fictitious" RTTs 610 are those measured by the airborne measuring station 110 for response packets 345 received for ranging packets 340 transmitted with a fictitious RA. The "wanted" RTTs 620 are those RTTs measured by the airborne measuring station 110 for response packets 345 received for ranging packets 340 transmitted with the RA of the target station 120. The "fictitious" RTTs 610 are the RTTs from the rogue responder station 450 and lie on the curve 605 which is similar to the "rogue RTTs" plot 510 in FIG. 5. The "wanted" RTTs 620 include RTTs from both the rogue responder station 450 and the target station 120. If the value of a "wanted" RTT 620 is close to the value of a "fictitious" RTT 610 that was measured at a time close to that of the "wanted" RTT 620, i.e. the TOAs are close, then it may be assumed that the measured "wanted" RTT 620 is due to the rogue responder station 450 and hence can be ignored. If the value of a "wanted" RTT 620 is not close to the value of a "fictitious" RTT 610 that was measured at a time close to that of the "wanted" RTT 620, then it may be assumed that the measured "wanted" RTT 620 is, indeed, due to the target station 120. In FIG. 6 the "filtered" RTTs 630 represent those RTTs that are determined to be due to response packets 345 only from the target station 120. The best fit curve 640, for the target station 120 may then be derived for the "filtered" RTTs 630. The resulting curve fit 640 in FIG. 6 represents the true location F 230 of the target station 120 as depicted in FIG. 4, despite the presence of a rogue responder station 450 at location G 440.

Although FIGS. 4, 5 and 6 show a single rogue responder station 450, it is understood that method 800 and process 900 are applicable for cases where more than one rogue responder station is present.

Figure 7:
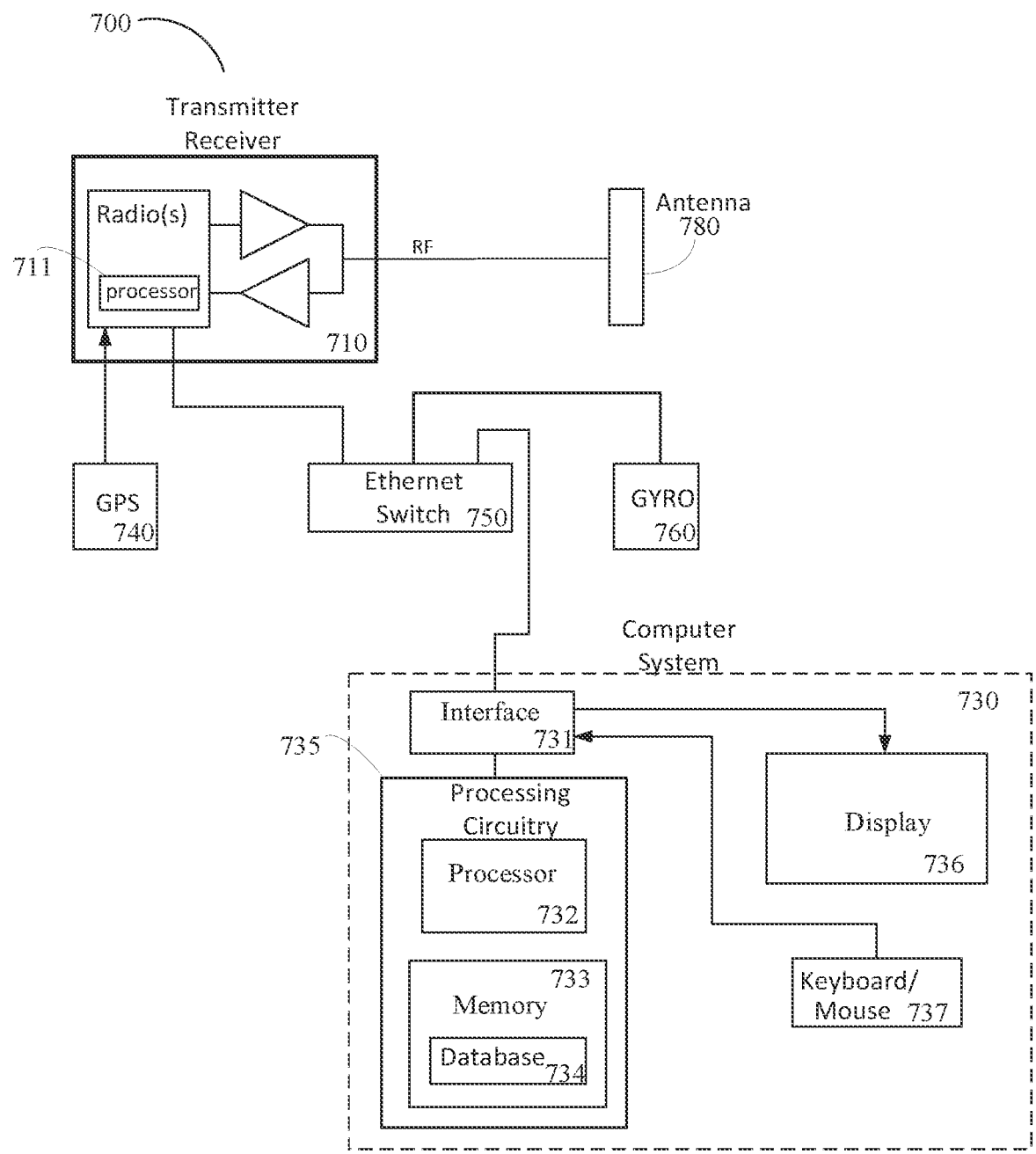
FIG. 7 is a block diagram of an example measuring station that is used in accordance with the principles described herein.

FIG. 7 is a block diagram of an example measuring station 700 that is used in accordance with the principles described herein. In one embodiment, measuring station 700 may be the airborne measuring station 110. In one embodiment, measuring station 700 may include an antenna assembly 780, a transceiver (transmitter receiver) 710, a computer system 730, a global positioning system (GPS) module 740, a gyro module 760 and a network switch 750 such as an Ethernet switch.

The transceiver 710 may transmit or receive radio frequency (RF) signals to and from the antenna assembly 780. The GPS module 740 output may be connected to the transceiver 710. The GPS module 740 may provide the latitude, longitude and altitude of the airborne platform. The transceiver 710 may append GPS information to any RF transmission and/or reception. The network switch 750 may be connected to the Transceiver 710, and the computer system 730. The transceiver 710 may include a processor 711. The GPS information may be provided to the processor 711 by the GPS module 740. RF receptions may have the GPS information added such that the position of the airborne platform is known for each received signal. The transceiver 710 may include more than one radio and therefore any transmission may be automatically received by another radio within the transceiver and by this means, the airborne platform position is also known for each transmission. The GPS information may be sent to the network switch 750 and therefore made available to the computer system 730.

The computer system 730 may include an interface 731. Interface 731 may contain an Ethernet connection to the network switch 750, the connection to a display 736, a connection to a keyboard and mouse 737 as well as interfacing to the processing circuitry 735. In some embodiments, the processing circuitry 735 may include a processor 732, a memory 733 and a database 734. The database 734 may contain the ground mapping information of the area of interest and the processor 732 and memory 733 may be used to carry out the exemplary processes described below with reference to FIGS. 8 and 9, using information on the position of the airborne platform derived from the GPS module 740, the gyro module 760, and information on the target station 120 which may be inputted using the keyboard and mouse 737. The display 736 may be used to show the ground map together with the estimated location and confidence ellipse of the target station 120. Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

Thus, in some embodiments, the processing circuitry 735 may include the memory 733 and a processor 732, the memory 733 containing instructions which, when executed by the processor 732, configure the processor 732 to perform the one or more functions described herein. In addition to a traditional processor and memory, the processing circuitry 735 may comprise integrated circuitry for processing and/or control, e.g., one or more processors and/or processor cores and/or FPGAs (Field Programmable Gate Array) and/or ASICs (Application Specific Integrated Circuitry).

The processing circuitry 735 may include and/or be connected to and/or be configured for accessing (e.g., writing to and/or reading from) the memory 733, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 733 may be configured to store code executable by control circuitry and/or other data, e.g., data pertaining to communication, e.g., configuration and/or address data of nodes, etc. The processing circuitry 735 may be configured to control any of the methods described herein and/or to cause such methods to be performed, e.g., by the processor 732. Corresponding instructions may be stored in the memory 733, which may be readable and/or readably connected to the processing circuitry 735. In other words, the processing circuitry 735 may include a controller, which may comprise a microprocessor and/or microcontroller and/or FPGA (Field-Programmable Gate Array) device and/or ASIC (Application Specific Integrated Circuit) device. It may be considered that the processing circuitry 735 includes or may be connected or connectable to memory, which may be configured to be accessible for reading and/or writing by the controller and/or processing circuitry 735.

Figure 8:
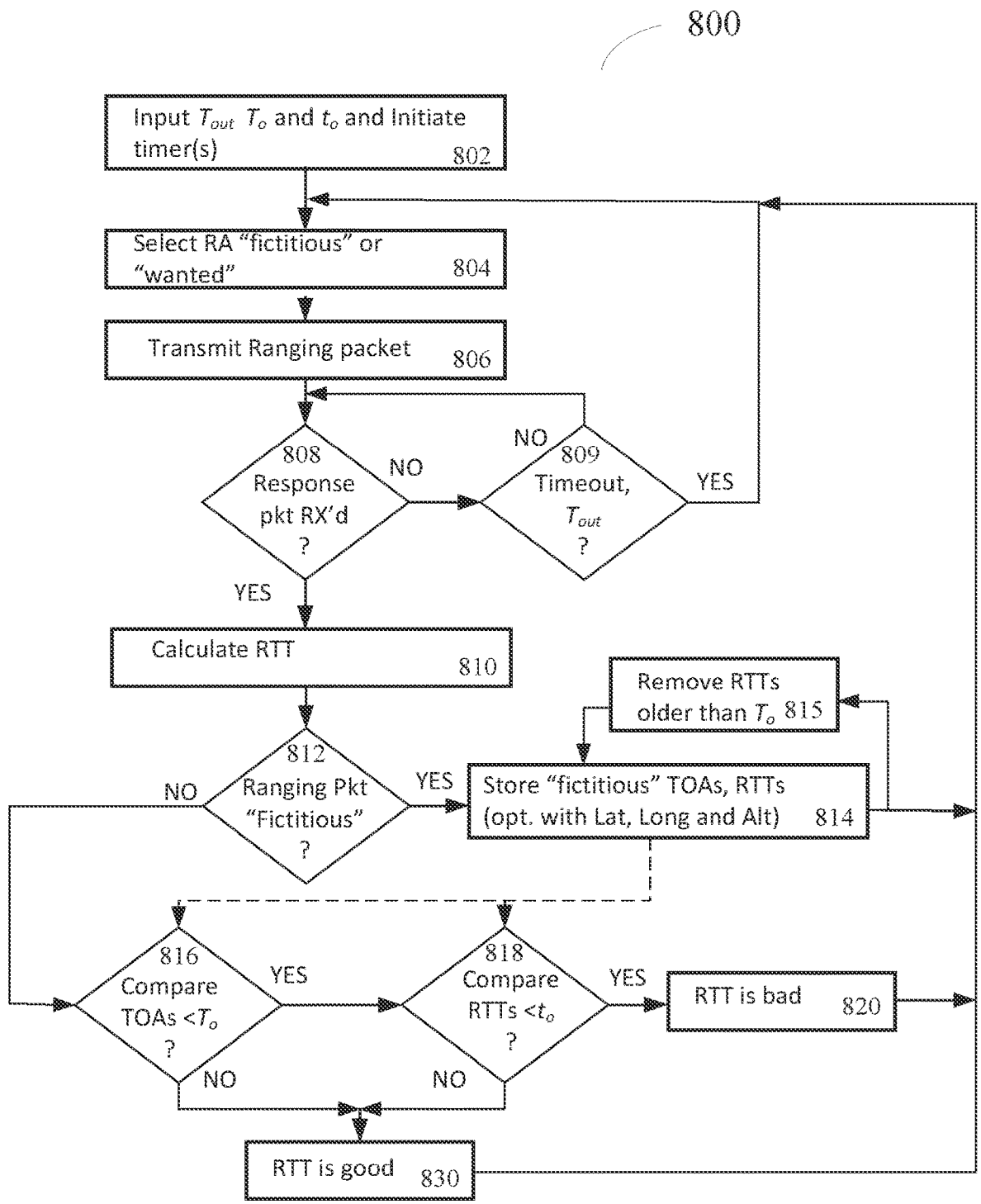
FIG. 8 is a flowchart of a non-limiting example of a method for the mitigation of RTTs from rogue responder stations.

FIG. 8 is a flowchart of a non-limiting example of a method 800 for the mitigation of RTTs from rogue responder stations. The method 800 may start at step 802 where time values $T_{out}$, $T_o$ and $t_o$ may be inputted and general timers initiated. The values for $T_{out}$, $T_o$ and $t_o$ may be preset in the code residing in the processing circuitry 735 or may be entered by the operator at the keyboard and mouse 737. The time values $T_{out}$, $T_o$ and $t_o$ and their usages are discussed below with reference to steps 809, 816 and 818 respectively. At step 804, the RA for the next ranging packet 340 may be selected. The RA may be a "fictitious" address or the address of the target station 120, the "wanted" address. A "fictitious" address is one that is highly unlikely to be an actual address of a station. The 'fictitious" address may be preset in the code residing in the processing circuitry 735 or may be entered by the operator at the keyboard and mouse 737. At step 806, the ranging packet 340 may be transmitted using the RA selected in step 804. The selection of a "fictitious" or "wanted" address may be based upon several criteria. For example, the selection may be such that a ranging packet using the "wanted" address is always followed by a ranging packet using a "fictitious" address, i.e. a one to one ratio. Alternatively, two ranging packets, using the "wanted" address, are followed by a ranging packet using a "fictitious" address, i.e. a two to one ratio. Other ratios may be selected. The ratio for the transmission of ranging packets with "wanted" and 'fictitious" addresses may be preset in the code residing in the processing circuitry 735 or may be entered by the operator at the keyboard and mouse 737. The ranging packet may be transmitted by the transceiver 710 via antenna assembly 780 with the ranging packet being formatted in the processor 711. At step 808 it may be determined if a response packet 345 has been received. The response packet 345 may be received by transceiver 710 where it may be demodulated and the contents passed via the network switch 750 and interface 731 to the processing circuitry 735. The TOD of the ranging packet 340 transmitted at step 806, the TOA of the response packet 345, and the position of the airborne measuring station 110, derived from the GPS module 740 and/or the gyro module 760, may be appended to the packet details. If at steps 808 and 809 a response packet is not received within a timeout period $T_{out}$, the value of which may be set in step 802, then the method may return to step 804. As discussed above with reference to FIG. 3, a reception window Trw 360 may be used and hence $T_{out}$ may be equal to time Tt 320. The value for $T_{out}$ may reside and may be applied in processor 711 in transceiver 710. If, at step 808 a response packet 345 is received, then at step 810 the RTT for that packet may be calculated. The RTT may be calculated by the processing circuitry 735 in the computer system 730.

At step 812 it is checked if the RTT calculated in step 810 is for a "fictitious" or "wanted" address, as selected in step 804. If the address is "fictitious" then the RTT, together with the TOA and the position of the airborne measuring station 110, may be stored at step 814 and the method returns to step 804. The RTT, TOA and position data may be stored in the database 734 of the memory 733. If, at step 812, the address is "wanted" then at step 816 it is checked if any TOA entry for an RTT for the "fictitious" address stored at step 814, is within a time of $T_o$ of the TOA of this RTT for the "wanted" address. If false, then at step 830 the "wanted" RTT may be assumed to be good, i.e. a "filtered" RTT as discussed above with reference to FIG. 6. If, at step 816 the result is true, then at step 818, the value of the "wanted" RTT is compared to the value of the "fictitious" RTT and if the values are more than $t_o$ apart, then again, at step 830 the "wanted" RTT may be assumed to be "good". If, at step 818, the values of the "wanted" RTT and the "fictitious" RTT are equal to or less than $t_o$ apart, then, at step 820 the "wanted" RTT may be assumed to be "bad". At step 816, the TOA of the "wanted" RTT is compared to each "fictitious" RTT stored at step 814. For each instance where the TOAs are equal or less than $T_o$ apart then the check at step 818 is performed. Therefore, if the result of step 818 is false, before declaring that the "wanted" RTT is "good", it may be confirmed that the check at step 816 has been made against all "fictitious" RTTs stored in step 814. Hence, the method may loop between steps 818 and 816 until the "wanted" RTT has been compared to every "fictitious" RTT stored in step 814.

Assuming that there are M "fictitious" RTTs, RTT(f), stored at step 814, then for each "wanted" RTT, RTT(w) from step 812, the following example logic may apply:

```
For i = 1 to M
    IF |TOA(w) – TOA(f)i| > T_o
        THEN RTT(w) is good
    ELSE IF |TOA(w) – TOA(f)i| ≤ T_o
        IF |RTTw) – RTT(f)i| > t_o
            THEN RTT(w) is "good"
            i = i + 1,
            IF i = M, THEN END
            ELSE NEXT i
        ELSE |RTT(w) – RTT(f)i| ≤ t_o
            THEN RTT(w) is "false"
END
Where TOA(w) is the TOA of the "wanted" RTT, and
    TOA(f) is the TOA of the "fictitious" RTT
```

Because the check, at step 816, is for the TOA of the "wanted" RTT to be within $T_o$ of each of the TOAs of the "fictitious" RTTs stored at step 814, there is no requirement to store "fictitious" RTTs that have TOAs that are older than $T_o$. Therefore, step 815 may optionally be added that checks the TOAs of each "fictitious" RTT stored at step 814 and, if older than $T_o$, remove it from the store. Then, at step 816, most if not all of the checks will be true if there are any RTTs stored.

At step 830, the "wanted" RTT is declared to be "good", i.e. that RTT is for the wanted target station 120. As discussed above with reference to FIG. 6, this "good" RTT is the "filtered" RTT 630. Hence, this RTT may be used in the calculations of the geo-location of the target station 120. At step 820, the "wanted" RTT is declared to be "bad". In this case it is assumed that the RTT is due to a rogue responder and hence is not used in the calculations of the geo-location of the target station 120.

The processes described above for steps 812, 814, 815, 816, 818, 820 and 830 may all be performed by the processing circuitry 735 in the computer system 730. The geo-calculations for the determination of the location of the target station 120 also may be performed by the processing circuitry 735 in the computer system 730 and the result may be displayed on the display 736.

The values for $T_o$ and $t_o$ are related. In time $T_o$ the airborne measuring station 110 will travel a distance d around the orbit 200, proportional to the speed v of the airborne measuring station 110. The value of the RTT for a target station 120 or a rogue responder station 450 will also change as the airborne measuring station changes position. As an example, an airborne measuring station 110 flying at a velocity v of 150 mph will travel 1100 feet in 5 seconds. Assuming that the airborne measuring station 110 is at an altitude of 5000 feet then the maximum change in RTT to a target station 120 is in the order of 1 µs. An approximation for the relationship between $T_o$ and $t_o$ may be $t_o = v\, T_o/C$, where C is the speed of light. Hence, suitable values for $T_o$ and $t_o$ may be 5 seconds and 1 µs, respectively. Other values may be chosen as the speed and altitude of the airborne measuring station varies.

Figure 9:
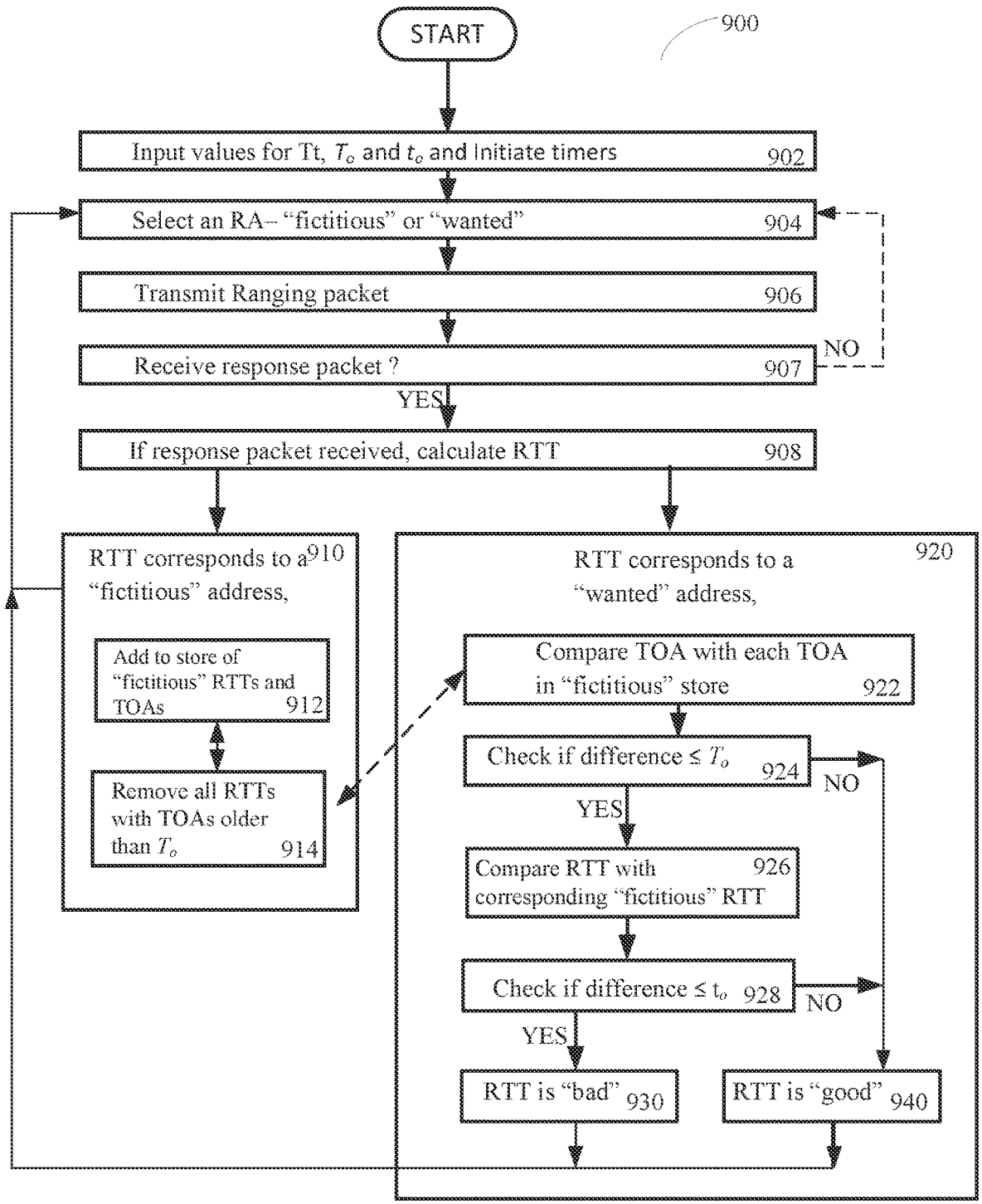
FIG. 9 is a flowchart of process of an example of an embodiment of the disclosure for the mitigation of RTTs from rogue responder stations for the determination of the geo-location of a target station.

FIG. 9 is a flow diagram of process 900 of an example of an embodiment of the disclosure for the mitigation of RTTs from rogue responder stations for the determination of the geo-location of a target station. Process 900 starts at step 902 where values for the variables time Tt 320, $T_o$ and $t_o$ are inputted. Default values are Tt=60 µs, $T_o$=5 seconds and $t_o$=1 µs. These values are preset in the code residing in the processing circuitry 735 but may be overwritten by an operator using the keyboard and mouse 737. At step 904 the RA for the ranging packet 340 is selected. A "fictitious" RA or a "wanted" RA is chosen, where the "wanted" RA is the MAC address of the wanted target station 120 and the "fictitious" RA is a MAC address that is highly unlikely to represent a real IEEE 802.11 compliant station. Code residing in the processing circuitry 735 is written to alternate the RA on a one to one ratio between the "wanted" address and the "fictitious" address. Other ratios may be selected by the operator using the keyboard and mouse 737. The ranging packet 340 is then transmitted via transceiver 710 (step 906) and the response packet 345 is received via transceiver 710 (step 907) as discussed above with reference to FIG. 3. If a response packet 345 is not received within time Tt 320, then the process returns to step 904. If a response packet 345 is received, then the RTT for that response packet is calculated at step 908. If the received response packet corresponds to a "fictitious" RA, then the process advances to step 910. The "fictitious" RTT and the TOA are added to a store, where a list of the "fictitious" RTTs and TOAs is kept (step 912). The list of "fictitious" RTTs and TOAs is examined such that any TOA in the list that is more than $T_o$ seconds old is removed (step 914).

If, at step 908, the received response packet corresponds to a "wanted" RA, then the process advances to step 920. At step 922, the TOA of the RTT calculated in step 908 is compared to each of the "fictitious" TOAs in the list at step 914. A check is carried out that the difference between the "wanted" TOA and each "fictitious" TOA is $T_o$ or less (step 924). If false, i.e. if there are no TOAs in the list at step 914, or if no TOA has a difference of more than $T_o$ seconds compared to the "wanted" TOA, then at step 940 the "wanted" RTT is designated as "good".

If, at step 924, the check is true, then, at step 926, the value of the "wanted" RTT is compared to the value of the each of the "fictitious" RTTs that correspond to TOAs that passed the check at step 924. A further check is then carried out that the difference between the "wanted" RTT and each "fictitious" RTT is $t_o$ or less (step 928). If true, i.e. the "wanted" RTT has a TOA that is within time $T_o$ of the TOA of a "fictitious" RTT TOA, and the RTT value within time $t_o$ of that "fictitious" RTT, then that RTT is designated as "bad" at step 930, i.e. it is assumed that the RTT is not from the target station 120 but is from a rogue responder station 450. If the check at step 928 is false, i.e. the difference between the "wanted" RTT and each "fictitious" RTT is greater than $t_o$, then the process advances to step 940 and the RTT is designated as "good". Hence, this "good" RTT may be used in the calculations of the geo-location of the target station 120. A "bad" RTT is assumed to be that of a rogue responder and hence is not used in the calculations of the geo-location of the target station 120.

In another embodiment of this disclosure, at step 910 the store of "fictitious" RTTs and TOAs (step 912) also includes the corresponding position information of the airborne measuring station 110. At step 914 a list is compiled that only includes the RTTs with TOAs that are within time $T_o$ of the present time, i.e. all RTTs with TOAs older than $T_o$ are removed. If the airborne measuring station 110 completes an orbit 200 and begins a second, similar orbit, then a further check is introduced at step 922 that compares the TOA with those of "fictitious" RTTs stored at step 912 where the position of the airborne measuring station 110 was the same, or, close to the present position of the airborne measuring station 110, for example the positions may be within 500 feet.

FIG. 10 is a flowchart of one example process performable by the measuring station 700. The process of FIG. 10 may be performed by the transceiver 710 and/or the processing circuitry 735. The process includes transmitting, via the transceiver 710, for example, a packet with a fictitious address of a station that does not correspond to an address of the wanted target station at step 1002. The process also includes transmitting a packet with the address of the wanted target station at step 1004. The process also includes, at step 1008 of determining, via the processing circuitry 735, for example, at least one of: a first difference between a round trip time (RTT) associated with a packet received from a responder station in response to the transmission of a packet with the fictitious address and an RTT associated with a packet received in response to the transmission of a packet with the address of the wanted target station, an RTT being a time elapsed between a time of transmission of a packet having an address and a time of reception of a packet received in response to transmission of the packet having the address at step 1010. The process also includes determining a second difference between a time of arrival (TOA) associated with the packet received from the responder station in response to the transmission of a packet with the fictitious address and a TOA associated with the packet received in response to the transmission of a packet with the address of the wanted target station at step 1012. The process further includes distinguishing between a response from the at least one rogue responder station and a response from the wanted target station based at least in part on at least at least one of the first difference and the second difference at step 1014. The process also includes determining the geo-location of the wanted target station based at least in part on responses determined to be responses from the wanted target station at step 1016.

According to one aspect, a method in a measuring station 700 is provided to determine a geo-location of a wanted target station in an environment that includes at least one rogue responder station. The method includes: transmitting, via the transceiver 710, a packet with a fictitious address of a station that does not correspond to an address of the wanted target station. The method also includes transmitting, via the transceiver 710, a packet with the address of the wanted target station. The method also includes determining, via the processing circuitry 735, at least one of: a first difference between a round trip time (RTT) associated with a packet received from a responder station in response to the transmission of a packet with the fictitious address and an RTT associated with a packet received in response to the transmission of a packet with the address of the wanted target station, an RTT being a time elapsed between a time of transmission of a packet having an address and a time of reception of a packet received in response to transmission of the packet having the address; and a second difference between a time of arrival (TOA) associated with the packet received from the responder station in response to the transmission of a packet with the fictitious address and a TOA associated with the packet received in response to the transmission of a packet with the address of the wanted target station. The method also includes distinguishing, via the processing circuitry 735, between a response from the at least one rogue responder station and a response from the wanted target station based at least in part on at least at least one of the first difference and the second difference, and determining the geo-location of the wanted target station based at least in part on responses determined to be responses from the wanted target station.

According to this aspect, in some embodiments, distinguishing between a response from the at least one rogue responder station and a response from the wanted target station includes comparing the determined first difference to a first threshold. When the determined first difference is greater than the first threshold, the method includes using the packet received in response to transmission of a packet with the wanted target station address to determine the geo-location of the wanted target station. In some embodiments, when the determined first difference is less than the first threshold, then: the method further includes comparing the determined second difference to a second threshold; and when the determined second difference is greater than the second threshold, then using the packet received in response to transmission of a packet with the wanted target station address to determine the geo-location of the wanted target station. In some embodiments, the second threshold is obtained by multiplying the first threshold by a ratio of a velocity of the measuring station to a speed of light. In some embodiments, an RTT associated with a packet received in response to transmission of a packet with the wanted target station address is compared to a plurality of RTTs associated with packets received in response to transmission of packets with multiple fictitious addresses. In some embodiments, the fictitious address includes a random number to achieve a likelihood that the fictitious address does not match an address of a rogue responder station. In some embodiments, the fictitious address is included in a medium access control (MAC) address that includes three octets of the MAC containing the random number. In some embodiments, the transmissions of packets with the fictitious address and the wanted target station address alternate. In some embodiments, the method includes retaining an RTT of a response to a transmission of packets with fictitious addresses in memory only when the RTT is less than the first threshold. In some embodiments, at least one of the first threshold and the second threshold is based at least in part on at least one of a speed and altitude of the measuring station.

According to another aspect, a measuring station 700 is configured to determine a geo-location of a wanted target station in an environment that includes at least one rogue responder station. The measuring station 700 includes a transceiver 710 configured to: transmit a packet with a fictitious address of a target station that does not correspond to an address of the wanted target station, and transmit a packet with the address of the wanted target station. The measuring station 700 also includes processing circuitry in 735 communication with the transceiver 710, the processing circuitry 735 configured to determine at least one of: a first difference between a round trip time (RTT) associated with a packet received in response to the transmission of a packet with the fictitious address and an RTT associated with a packet received in response to the transmission of a packet with the address of the wanted target station, an RTT being a time elapsed between a time of transmission of a packet having an address and a time of reception of a packet received in response to transmission of the packet having the address; and a second difference between a time of arrival (TOA) associated with the packet received in response to the transmission of a packet with the fictitious address and a TOA associated with the packet received in response to the transmission of a packet with the address of the wanted target station. The processing circuitry 735 is further configured to distinguish between a response from the at least one rogue responder station and a response from the wanted target station based at least in part on at least at least one of the first difference and the second difference. The processing circuitry 735 is further configured to determine the geo-location of the wanted target station based at least in part on responses determined to be responses from the wanted target station.

According to this aspect, in some embodiments, distinguishing between a response from the at least one rogue responder station and a response from the wanted target station includes: comparing the determined first difference to a first threshold; and when the determined first difference is greater than the first threshold, then using the packet received in response to transmission of a packet with the wanted target station address to determine the geo-location of the wanted target station. In some embodiments, the processing circuitry 735 is further configured to: when the determined first difference is less than the first threshold, compare the determined second difference to a second threshold; and when the determined second difference is greater than the second threshold, then use the packet received in response to transmission of a packet with the wanted target station address to determine the geo-location of the wanted target station. In some embodiments, the second threshold is obtained by multiplying the first threshold by a ratio of a velocity of the measuring station to a speed of light. In some embodiments, an RTT associated with a packet received in response to transmission of a packet with the wanted target station address is compared to a plurality of RTTs associated with packets received in response to transmission of packets with multiple fictitious addresses. In some embodiments, the fictitious address includes a random number to achieve a likelihood that the fictitious address does not match an address of a rogue responder station. In some embodiments, the fictitious address is included in a medium access control (MAC) address that includes three octets of the MAC containing the random number. In some embodiments, the transmissions of the fictitious address and the wanted target station address alternate. In some embodiments, the processing circuitry 735 is further configured to retain an RTT of a response to a transmission of a packet with fictitious addresses in memory only when the RTT is less than the first threshold. In some embodiments, at least one of the first threshold and the second threshold is based at least in part on at least one of a speed and altitude of the measuring station.

Some example embodiments may include the following:

Embodiment 1. A method for a measuring station to determine the geo-location of a wanted target station in the presence of one or more rogue responder stations, the method comprising:

selecting a "fictitious" medium access control, MAC, address for a target station that is unlikely to correspond to a real MAC address for an IEEE 802.11 compliant station;

transmitting ranging packets that are either addressed to the fictitious address or to the address of the wanted target station;

measuring a plurality of round trip times, RTT, each RTT being a time elapsed between a transmission of a ranging packet and a reception of a response packet;

storing RTTs, together with their times of arrival, TOAs, that correspond to response packets that are received in response to ranging packets addressed to the fictitious address;

comparing each of the stored "fictitious" RTTs and TOAs to the "wanted" RTTs and TOAs that correspond to response packets that are received in response to ranging packets addressed to the target station's address; and using the differences between the stored "fictitious" RTTs and TOAs and the received "wanted" RTTs and TOAs to designate the "wanted" RTT as "good" or "bad" using only "good" RTTs in the calculations for the geo location of the wanted target station.

Embodiment 2. The method of Embodiment 1 where:

if the difference between a "fictitious" TOA and a "wanted" TOA is equal to or less than a preset time interval $T_o$;

and, if the difference between the RTTs that correspond to those TOAs, is equal to or less than a preset time interval $t_o$, then, designating the RTT that corresponded to a response packet that was received in response to a ranging packet addressed to the target station's address, as "bad".

Embodiment 3. The method of Embodiment 1 where:

if the difference between a "wanted" TOA and all "fictitious" TOAs is greater than a preset time interval $T_o$:

designating the RTT that corresponds to that "wanted" TOA of a response packet that was received in response to a ranging packet addressed to the target station's address, as "good".

Embodiment 4. The method of Embodiment 1 where:

if the difference between a "fictitious" TOA and a "wanted" TOA is equal to or less than a preset time interval $T_o$, and, if the difference between the "fictitious" RTT and the "wanted" RTT that correspond to the "fictitious" TOA and "wanted" TOA, is greater than a preset time interval $t_o$, then, designating the "wanted" RTT that corresponded to a response packet that was received in response to a ranging packet addressed to the target station's address, as "good".

Embodiment 5. The method of Embodiment 1 further comprising:

storing RTTs and positional data of the measuring station, that correspond to response packets that are received in response to ranging packets addressed to the fictitious address;

comparing each of the stored "fictitious" RTTs to the "wanted" RTTs that correspond to response packets that are received in response to ranging packets addressed to the target station's address, and determining if the measuring station is within a preset distance d of a stored "fictitious"

RTT position, and, if true:

if the difference between the "fictitious" RTT and the "wanted" RTT is less than a preset time interval $t_o$;

then, designating that "wanted" RTT as "bad".

Embodiment 6. The method of Embodiment 1 where the measuring station is airborne.

Embodiment 7. The method of Embodiment 1 where the preset values of $T_o$ and $t_o$ are related by the expression $t_o = v$ L/C where v is the velocity of the measuring station, and C is the speed of light.

Embodiment 8. A wireless device for a measuring station for determining the geo-location of a wanted target station in the presence of one or more rogue responder stations, the wireless device comprising:

a transceiver configured to:

transmit ranging packets that are either addressed to a fictitious address or to the address of the wanted target station;

receive a response packet in response to the transmitted ranging packet; and measure the RTT, each RTT being a time elapsed between a transmission of a ranging packet and a reception of a response packet; and processing circuitry in communication with the transceiver, the processing circuitry being configured to:

select a "fictitious" medium access control, MAC, address for a target station that is unlikely to correspond to a real MAC address for an IEEE 802.11 compliant station;

store RTTs, together with their times of arrival, TOAs, that correspond to response packets that are received in response to ranging packets addressed to the fictitious address;

compare each of the stored "fictitious" RTTs and TOAs to the "wanted" RTTs and TOAs that correspond to response packets that are received in response to ranging packets addressed to the target station's address; and use the differences between the stored "fictitious" RTTs and TOAs and the received "wanted" RTTs and TOAs to designate the "wanted" RTT as "good" or "bad";

use only "good" RTTs in the calculations for the geo location of the wanted target station.

Embodiment 9. The wireless device of Embodiment 8 wherein the processing circuitry is further configured to determine that:

if the difference between a "fictitious" TOA and a "wanted" TOA is equal to or less than a preset time interval $T_o$, and, if the difference between the RTTs that correspond to those TOAs, is equal to or less than a preset time interval $t_o$:

then designate the RTT that corresponded to a response packet that was received in response to a ranging packet addressed to the target station's address, as "bad".

Embodiment 10. The wireless device of Embodiment 8 wherein the processing circuitry is further configured to determine that:

if the difference between a "wanted" TOA and all "fictitious" TOAs is greater than a preset time interval $T_o$:

designate the RTT that corresponds to that "wanted" TOA of a response packet that was received in response to a ranging packet addressed to the target station's address, as "good".

Embodiment 11. The wireless device of Embodiment 8 wherein the processing circuitry being further configured to determine that:

if the difference between a "fictitious" TOA and a "wanted" TOA is equal to or less than a preset time interval $T_o$, and, if the difference between the "fictitious" RTT and the "wanted" RTT that correspond to the "fictitious" TOA and "wanted" TOA, is greater than a preset time interval $t_o$:

then, designate the "wanted" RTT that corresponded to a response packet that was received in response to a ranging packet addressed to the target station's address, as "good".

Embodiment 12. The wireless device of Embodiment 8 wherein the processing circuitry being further configured to:

store RTTs and positional data of the measuring station, that correspond to response packets that are received in response to ranging packets addressed to the fictitious address;

compare each of the stored "fictitious" RTTs to the "wanted" RTTs that correspond to response packets that are received in response to ranging packets addressed to the target station's address: and determine if the measuring station is within a preset distance d of a stored "fictitious" RTT position, and if true:

if the difference between the "fictitious" RTT and the "wanted" RTT is less than a preset time interval $t_o$, designating that "wanted" RTT as "bad".

Embodiment 13. A measuring station for determining the geo-location of a wanted target station in the presence of one or more rogue responder stations, the target station responding to ranging packets transmitted by the measuring station, the measuring station comprising:

a global positioning system (GPS) module configured to:

provide location parameters associated with a location of the measuring station; and a wireless device in communication with the GPS module, the wireless device comprising:

a transceiver configured to:

transmit ranging packets that are either addressed to a fictitious address or to the address of the wanted target station;

receive a response packet in response to the transmitted ranging packet; and measure the RTT, each RTT being a time elapsed between a transmission of a ranging packet and a reception of a response packet; and processing circuitry in communication with the transceiver, the processing circuitry being configured to:

select a "fictitious" medium access control, MAC, address for a target station that is unlikely to correspond to a real MAC address for an IEEE 802.11 compliant station;

store RTTs, together with their times of arrival, TOAs, that correspond to response packets that are received in response to ranging packets addressed to the fictitious address;

compare each of the stored "fictitious" RTTs and TOAs to the "wanted" RTTs and TOAs that correspond to response packets that are received in response to ranging packets addressed to the target station's address: and use the differences between the stored "fictitious" RTTs and TOAs and the received "wanted" RTTs and TOAs to designate the "wanted" RTT as "good" or "bad";

use only "good" RTTs in the calculations for the geo location of the wanted target station.

Embodiment 14. The measuring station of Embodiment 13 wherein the processing circuitry is further configured to determine that:

if the difference between a "wanted" TOA and all "fictitious" TOAs is greater than a preset time interval $T_o$:

designate the RTT that corresponds to that "wanted" TOA of a response packet that was received in response to a ranging packet addressed to the target station's address, as "good".

Embodiment 15. The measuring station of Embodiment 13 wherein the processing circuitry being further configured to determine that:

if the difference between a "fictitious" TOA and a "wanted" TOA is equal to or less than a preset time interval $T_o$, and, if the difference between the "fictitious" RTT and the "wanted" RTT that correspond to the "fictitious" TOA and "wanted" TOA, is greater than a preset time interval $t_o$:

then, designate the "wanted" RTT that corresponded to a response packet that was received in response to a ranging packet addressed to the target station's address, as "good".

Embodiment 16. The measuring station of Embodiment 13 wherein the processing circuitry being further configured to:

store RTTs and positional data of the measuring station, that correspond to response packets that are received in response to ranging packets addressed to the fictitious address;

compare each of the stored "fictitious" RTTs to the "wanted" RTTs that correspond to response packets that are received in response to ranging packets addressed to the target station's address: and determine if the measuring station is within a preset distance d of a stored "fictitious" RTT position, and if true:

if the difference between the "fictitious" RTT and the "wanted" RTT is less than a preset time interval $t_o$;

designating that "wanted" RTT as "bad".

Methods and measuring stations are disclosed to determine the geo-location of a wanted target station in the presence of one or more rogue responder stations. According to one aspect, a method includes selecting a "fictitious" medium access control (MAC) address for a station that is unlikely to correspond to a real MAC address for an IEEE 802.11 compliant station, transmitting ranging packets that are either addressed to the fictitious address or to the address of the wanted target station, measuring a plurality of round trip times, RTT, each RTT being a time elapsed between a transmission of a ranging packet and a reception of a response packet, storing RTTs, together with their times of arrival, TOAs, that correspond to response packets that are received in response to ranging packets addressed to the fictitious address, comparing each of the stored "fictitious" RTTs and TOAs to the "wanted" RTTs and TOAs that correspond to response packets that are received in response to ranging packets addressed to the target station's address, and using the differences between the stored "fictitious" RTTs and TOAs and the received "wanted" RTTs and TOAs to designate the "wanted" RTT as "good" or "bad". Only "good" RTTs are used in the calculations for the geo location of the wanted target station.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the values for $T_o$, $t_o$, and the reception window Trw and Tt; the timing between RTTs, the ratio of the transmission of ranging packets with fictitious or wanted RAs, variations relayed to altitude and speed of the airborne measuring station. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a measuring station to determine a geo-location of a wanted target station in an environment that includes at least one rogue responder station, the method comprising:
    transmitting a packet with a fictitious address of a station that does not correspond to an address of the wanted target station;
    transmitting a packet with the address of the wanted target station;
    determining at least one of:
        a first difference between a round trip time (RTT) associated with a packet received from a responder station in response to the transmission of a packet with the fictitious address and an RTT associated with a packet received in response to the transmission of a packet with the address of the wanted target station, an RTT being a time elapsed between a time of transmission of a packet having an address and a time of reception of a packet received in response to transmission of the packet having the address; and
        a second difference between a time of arrival (TOA) associated with the packet received from the responder station in response to the transmission of a packet with the fictitious address and a TOA associated with the packet received in response to the transmission of a packet with the address of the wanted target station; and
    distinguishing between a response from the at least one rogue responder station and a response from the wanted target station based at least in part on at least at least one of the first difference and the second difference; and
    determining the geo-location of the wanted target station based at least in part on responses determined to be responses from the wanted target station.

2. The method of claim 1, wherein distinguishing between a response from the at least one rogue responder station and a response from the wanted target station includes:
    comparing the determined first difference to a first threshold; and
    when the determined first difference is greater than the first threshold, then using the packet received in response to transmission of a packet with the wanted target station address to determine the geo-location of the wanted target station.

3. The method of claim 2, further comprising:
    when the determined first difference is less than the first threshold, then:
        comparing the determined second difference to a second threshold; and
        when the determined second difference is greater than the second threshold, then using the packet received in response to transmission of a packet with the wanted target station address to determine the geo-location of the wanted target station.

4. The method of claim 3, wherein the second threshold is obtained by multiplying the first threshold by a ratio of a velocity of the measuring station to a speed of light.

5. The method of claim 4, wherein an RTT associated with a packet received in response to transmission of a packet with the wanted target station address is compared to a plurality of RTTs associated with packets received in response to transmission of packets with multiple fictitious addresses.

6. The method of claim 1, wherein the fictitious address includes a random number to achieve a likelihood that the fictitious address does not match an address of a rogue responder station.

7. The method of claim 6, wherein the fictitious address is included in a medium access control (MAC) address that includes three octets of the MAC containing the random number.

8. The method of claim 1, wherein the transmissions of packets with the fictitious address and the wanted target station address alternate.

9. The method of claim 1, further comprising retaining an RTT of a response to a transmission of packets with fictitious addresses in memory only when the RTT is less than the first threshold.

10. The method of claim 1, wherein at least one of the first threshold and the second threshold is based at least in part on at least one of a speed and altitude of the measuring station.

11. A measuring station configured to determine a geo-location of a wanted target station in an environment that includes at least one rogue responder station, the measuring station comprising:
    a transceiver configured to:
        transmit a packet with a fictitious address of a target station that does not correspond to an address of the wanted target station; and
        transmit a packet with the address of the wanted target station; and
    processing circuitry in communication with the transceiver, the processing circuitry configured to:
        determine at least one of:

a first difference between a round trip time (RTT) associated with a packet received from a responder station in response to the transmission of a packet with the fictitious address and an RTT associated with a packet received in response to the transmission of a packet with the address of the wanted target station, an RTT being a time elapsed between a time of transmission of a packet having an address and a time of reception of a packet received in response to transmission of the packet having the address; and a second difference between a time of arrival (TOA) associated with the packet received from the responder station in response to the transmission of a packet with the fictitious address and a TOA associated with the packet received in response to the transmission of a packet with the address of the wanted target station; and distinguish between a response from the at least one rogue responder station and a response from the wanted target station based at least in part on at least at least one of the first difference and the second difference; and determine the geo-location of the wanted target station based at least in part on responses determined to be responses from the wanted target station.

12. The measuring station of claim 11, wherein distinguishing between a response from the at least one rogue responder station and a response from the wanted target station includes:

comparing the determined first difference to a first threshold; and when the determined first difference is greater than the first threshold, then using the packet received in response to transmission of a packet with the wanted target station address to determine the geo-location of the wanted target station.

13. The measuring station of claim 12, wherein the processing circuitry is further configured to:

when the determined first difference is less than the first threshold, then:
  compare the determined second difference to a second threshold; and
  when the determined second difference is greater than the second threshold, then use the packet received in response to transmission of a packet with the wanted target station address to determine the geo-location of the wanted target station.

14. The measuring station of claim 13, wherein the second threshold is obtained by multiplying the first threshold by a ratio of a velocity of the measuring station to a speed of light.

15. The measuring station of claim 14, wherein an RTT associated with a packet received in response to transmission of a packet with the wanted target station address is compared to a plurality of RTTs associated with packets received in response to transmission of packets with multiple fictitious addresses.

16. The measuring station of claim 11, wherein the fictitious address includes a random number to achieve a likelihood that the fictitious address does not match an address of a rogue responder station.

17. The measuring station of claim 16, wherein the fictitious address is included in a medium access control (MAC) address that includes three octets of the MAC containing the random number.

18. The measuring station of claim 11, wherein the transmissions of the fictitious address and the wanted target station address alternate.

19. The measuring station of claim 11, wherein the processing circuitry is further configured to retain an RTT of a response to a transmission of a packet with fictitious addresses in memory only when the RTT is less than the first threshold.

20. The measuring station of claim 11, wherein at least one of the first threshold and the second threshold is based at least in part on at least one of a speed and altitude of the measuring station.

* * * * *